Jan. 13, 1959     H. G. FOLLINGSTAD     2,869,028
OSCILLOSCOPIC DISPLAY METHOD OR MEANS
Filed Sept. 21, 1956     2 Sheets—Sheet 1
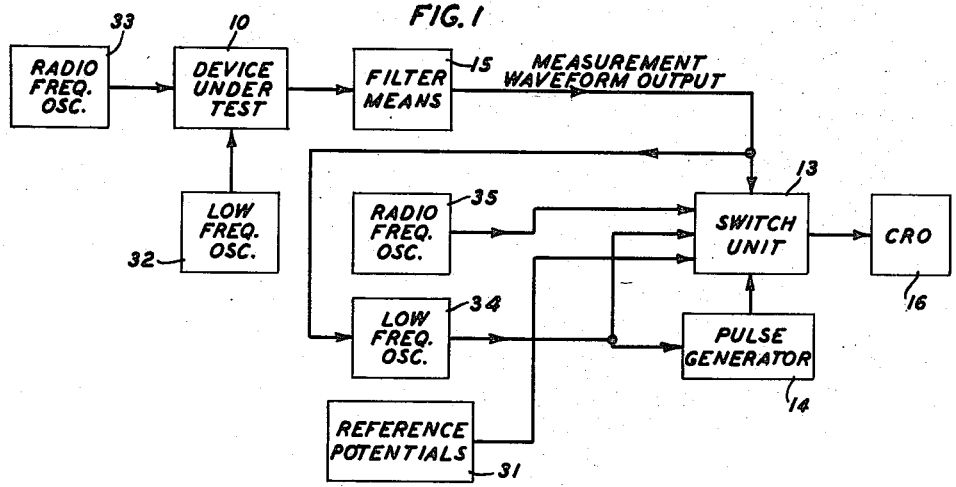
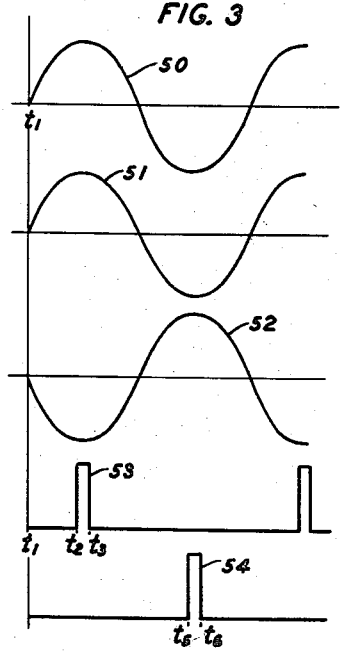
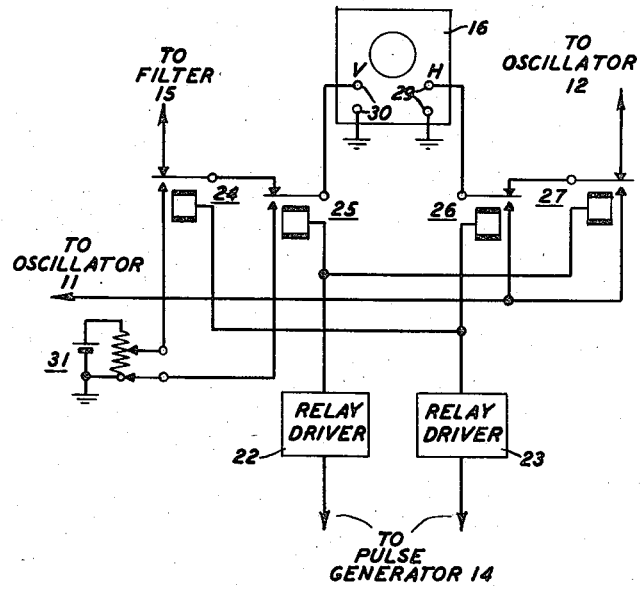
INVENTOR
H. G. FOLLINGSTAD
BY
R. B. Ardis
ATTORNEY Jan. 13, 1959 H. G. FOLLINGSTAD 2,869,028
OSCILLOSCOPIC DISPLAY METHOD OR MEANS
Filed Sept. 21, 1956 2 Sheets-Sheet 2
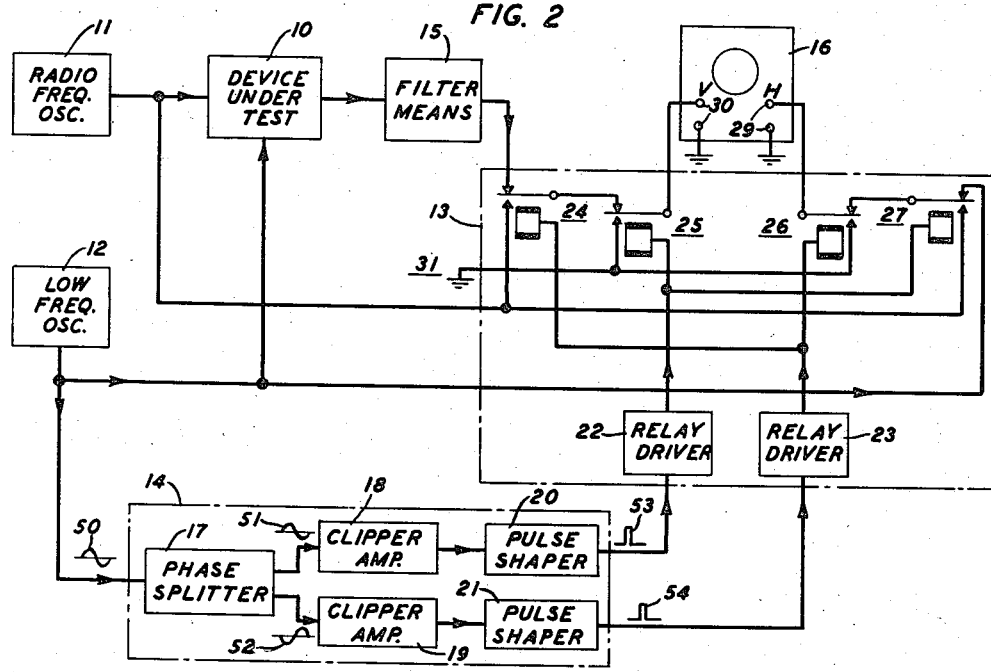
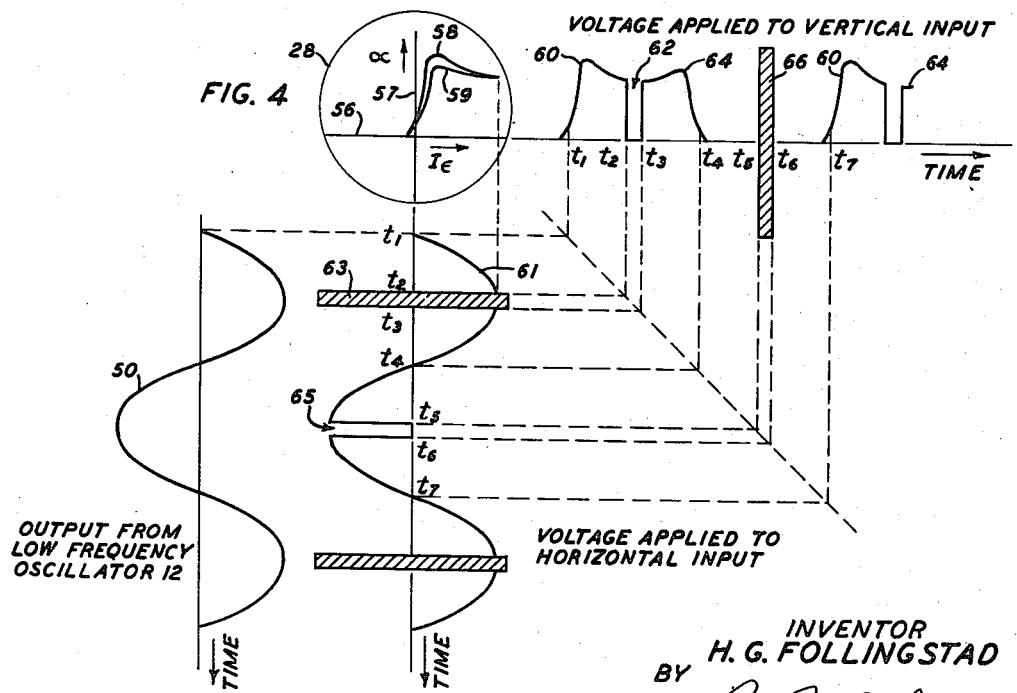
INVENTOR
H. G. FOLLINGSTAD
BY
R. B. Ardis
ATTORNEY

United States Patent Office 2,869,028
Patented Jan. 13, 1959

2,869,028

OSCILLOSCOPIC DISPLAY METHOD OR MEANS

Henry G. Follingstad, Westfield, N. J., assignor to Bell Telephone Laboratories, Incorporated, New York, N. Y., a corporation of New York Application September 21, 1956, Serial No. 611,319

13 Claims. (Cl. 315—26)

This invention relates to test equipment and, in particular, to circuits for use with cathode ray oscilloscopes to provide a simultaneous display of measurement and reference waveforms.

It is often necessary to measure the variations of a parameter of a device, such as a vacuum tube or a transistor, as a function of one of its operating conditions. One of the methods utilized for obtaining dynamic measurements involves applying a small amplitude constant frequency signal to the input of the device while varying the operating condition in a repetitious fashion. The output from the device will contain harmonics of the frequency at which the condition is varied, plus signals at the frequency of the input signal and sidebands thereof. By the use of filtering means the envelope of the signals at the frequency of the input signal and its sidebands may be obtained for displaying on a cathode ray oscilloscope. A proper interpretation of the envelope signal display will provide the desired parameter information.

The above-referred to envelope signal produced by the filtering means will contain frequency components which are also harmonics of the frequency at which the condition is varied. In order for the filtering means to produce a substantially true envelope signal, it is desirable to have a large frequency difference between the harmonics in the envelope signal and the signals of which it is the envelope. This may be accomplished by utilizing a high frequency input signal and a low frequency variation of the desired condition. The maximum frequency of the high frequency signal will be limited by the device under test while the low frequency variation will be limited by several factors associated with cathode ray oscilloscopes. One of these factors is that the fundamental of the envelope signal is equal to the frequency at which the desired condition is being varied and therefore the sweep frequency of the oscilloscope cannot exceed this frequency and still provide a complete presentation. Another factor is that the sweep frequency must exceed the flicker frequency of the oscilloscope (which is approximately 25 cycles per second for intermediate persistence cathode ray tubes). Therefore the low frequency variation of the operating condition will be determined by the flicker frequency of the cathode ray tube and will be equal to the sweep frequency.

As an example of the above-stated frequency problem, it may be desirable to determine the variation of the low frequency value of the alpha parameter (current gain) of a transistor as a function of emitter current. It is usually found that in a measurement of this type the envelope signal will contain the 400th harmonic. Using "round figures," if a sweep frequency of 25 cycles per second is used, the frequency of the 400th harmonic is 25 times 400 or 10 kilocycles. For envelope detecting purposes it is desirable to have a frequency difference of one decade; therefore, the frequency of the input signal should be 100 kilocycles. For most transistors the transient time effect at 100 kilocycles is not sufficiently large to cause alpha to depart from its low frequency value.

If a sweep frequency of 50 cycles per second is used, the frequency of the input signal must be 200 kilocycles, that is, twice the frequency of the input signal at 25 cycles per second, in order to have the same frequency separation. The transient time effect is now sufficiently large to cause the alpha parameter in some transistors to deviate from its low frequency value. When this occurs, the low frequency value of the alpha parameter cannot be determined by this method of measuring.

In making measurements of the aforementioned types, it is sometimes necessary to provide reference information on the screen of the cathode ray tube simultaneously with the measurement waveform. A known method for performing this function requires utilizing the retrace time of the oscilloscope for displaying the reference information. This is not feasible when a retrace of the varying condition is necessary to study hysteresis effects which may be present in the device under test. Another technique displays a measurement waveform during alternate sweep cycles and the reference wave form during the intermediate cycles. This technique requires a sweep frequency which is more than twice the flicker frequency as each waveform is displayed only on every other cycle of sweep. The undesirability of a high sweep frequency in some cases has already been discussed.

An object of the present invention is to display measurement and reference waveforms simultaneously on a screen of the cathode ray oscilloscope and still leave the retrace time of the oscilloscope available for the study of hysteresis effects.

Another object is to display a measurement waveform having a fundamental frequency only slightly greater than the flicker frequency of the oscilloscope simultaneously with a reference waveform and still prevent the waveforms from appearing to flicker.

A feature of this invention is apparatus for use with an oscilloscope wherein these and other objects are accomplished. Through the use of this apparatus, a small percentage of the sweep time of the oscilloscope cathode ray tube beam is utilized in a unique manner for placing the reference information on the face of the tube so that it is displayed simultaneously with the measurement waveform from the device being tested.

In one of its broader aspects, the invention contemplates the use of a source of signals which oscillate in synchronism with the fundamental of a measurement wave, another source of signals which oscillate at a frequency greater than the fundamental, a source of reference potentials, and switching means responsive to the signals synchronous with the fundamental for connecting the measurement waveform and the source of synchronous signals to respective sets of input terminals of an oscilloscope during at least one portion of each cycle of the synchronous signal and for connecting the source of signals which oscillate at a frequency greater than that of the fundamental and the source of reference potentials to respective sets of input terminals of the oscilloscope during at least one other predetermined portion of the synchronous signal.

In one embodiment of the invention a source of sinusoidal signals synchronous with the fundamental of the measurement waveform is utilized as a source of sweep potential when the measurement waveform is displayed and as a timing source for operating the connecting means. A source of radio frequency signals and a source of direct potentials are provided for producing the reference waveforms. The connecting means comprise relays which are connected in such a manner that the source of measurement waveforms and the source of sinusoidal signals are connected to respective sets of the oscilloscope terminals when the relays are unenergized and the source of radio frequency signals and the source of direct potentials are connected to respective sets of the terminals when the relays are energized.

A particular advantage is obtained through the use of the present invention when the above-referred to synchronous signal is substantially sinusoidal in nature and the connecting means connect the sources necessary for producing the reference waveforms to the oscilloscope at times which include the maximum and/or minimum values of the signal. Because the rate of change of the potential level of a sinusoidal waveform decreases to zero at the maximum and minimum values, the rate of deflection of an electron beam deflected by the signal likewise decreases to zero. Therefore, the percentage of the measurement waveform that is not displayed is less than the percentage of the sweep time utilized for displaying the reference waveforms.

Other objects and features of the invention will become apparent from a study of the following detailed description of several specific embodiments. In the drawings, in which like reference symbols represent like or similar parts:

Fig. 1 shows a block diagram illustrating one embodiment of the invention;

Fig. 2 depicts a block diagram similar to Fig. 1 wherein several of the blocks have been shown in more detail;

Fig. 3 is a graph showing waveforms of signals occurring at several points in the block diagram of Fig. 2;

Fig. 4 is a graphical representation of signal waveforms present on the input terminals of an oscilloscope to present a typical display obtained through the use of the present invention; and Fig. 5 illustrates a block diagram of an alternative arrangement of a portion of the embodiment of the invention shown in Fig. 2.

In Fig. 1, a block diagram is shown which illustrates one embodiment of the invention. A low frequency oscillator 32 is connected to a device under test 10 for varying an operating condition thereof. For example, the device 10 may comprise a transistor whose alpha parameter as a function of emitter current is desired. The input of the device 10 is connected to a radio frequency oscillator 33 which provides a low level unmodulated signal thereto, while the output of the device 10 is connected to filter means 15. Another low frequency oscillator 34 is connected to a switch unit 13 and a pulse generator 14. The oscillator 34 is synchronized with the fundamental of the measurement waveform output from the filter means 15. The outputs of the pulse generator 14, a radio frequency oscillator 35, the filter means 15 and a source of reference potentials 31 are connected to the switch unit 13. The output of the switch unit 13 is connected to the horizontal and the vertical input terminals of a cathode ray oscilloscope 16.

In operation, the radio frequency oscillator 33 supplies an input signal to the device 10 while the low frequency oscillator 32 varies an operating condition thereof. The filter means 15 is adapted to produce a signal which represents the envelope of the output signals at the frequency of the input signal and its sidebands. The filter means may comprise two filters connected in a series relationship. The first filter may be a bandpass type for passing only the signals at the frequency of the input signal and its sidebands and the second filter may be designed to detect the envelope of the signals passed by the first filter. Filters of the above-referred to types are well known in the art and therefore will not be discussed in detail. The envelope signal produced by the filtering means 15 will contain harmonics of the signals from the oscillator 12. (The term "harmonics" is to be understood to include the fundamental, which is the first harmonic.) Amplifying means, although not shown, may be provided to increase the amplitude of the envelope signal. The oscillator 35 is connected to the switch unit 13 and is utilized with the source of reference potentials 31 to provide the reference waveforms. The pulse generator 14 is adapted to produce pulses during predetermined portions of each cycle of the signal from the oscillator 34. These pulses activate the switch unit 13 whereby the various inputs to the switch unit 13 are connected to the oscilloscope 16 in a manner to be explained in detail in conjunction with Fig. 2.

Fig. 2 is identical to Fig. 1, except radio frequency oscillators 33 and 35 are combined in a radio frequency oscillator 11, low frequency oscillators 32 and 34 are combined in a low frequency oscillator 12, and particular block diagrams for the switch unit 13 and the pulse generator 14 are illustrated. The fact that the oscillators may be combined as shown in Fig. 2 will become apparent through the discussion to follow.

The input of a phase splitter 17 of the pulse generator 14 comprises a sine wave signal 50 from the oscillator 12 while the output thereof comprises sine wave signals 51 and 52 which are displaced 180 degrees with respect to one another. This is further illustrated in Fig. 3 where the horizontal axis represents time. A clipper amplifier 18 and a pulse shaper 20 produce a pulse 53 which includes, in a time sense, the maximum positive value of the signal 51, and a clipper amplifier 19 and a pulse shaper 21 produce a pulse 54 which includes, in a time sense, the maximum positive amplitude of the signal 52.

The switch unit 13 comprises relay drivers 22 and 23 and relays 24, 25, 26, and 27. The output pulses from the pulse generator 14 activate the relay drivers 22 and 23, which in turn energize their associated relays. The relay drivers 22 and 23 may comprise amplifying means or thyratron switching means well known in the art. In operation, the pulse 53 causes the relay driver 22 to energize the relays 25 and 27, while the pulse 54 causes the relay driver 23 to energize the relays 24 and 26. As is obvious to those skilled in the art, the relays 24 and 26 and the relays 25 and 27 may be combined, respectively, to produce two relays of the double-pole, double-throw type if the double-pole, double-throw type has a sufficiently fast operating speed. For purposes of explanation, individual units have been utilized.

As shown in the embodiment of the invention illustrated in Fig. 2, the relays are in their unenergized positions. Therefore, the input to horizontal sweep terminals 29 of the oscilloscope 16 comprises the signal 50 from the low frequency oscillator 12, and the input to vertical sweep terminals 30 of the oscilloscope 16 comprises the filtered output from the device 10. In accordance with an important feature of the invention, when the pulse 53 occurs the relay driver 22 energizes the relays 25 and 27 so that the vertical terminals 30 are grounded and the input to the horizontal terminals 29 comprises radio frequency oscillations from the radio frequency oscillator 11. A horizontal line is produce on the screen of the cathode ray oscilloscope 16 as a result of this action. When the pulse 53 is no longer present, the relays 24 and 26 are de-energized and the circuit is returned to the condition shown in Fig. 2. In accordance with another feature of the invention, when pulse 54 occurs the relay driver 23 energizes the relays 24 and 26. The horizontal terminals 29 are grounded and the input to the vertical terminals 30 comprises radio frequency oscillations from the radio frequency oscillator 11. This produces a vertical line on the screen of the oscilloscope 16. If the frequency of the output of the low frequency oscillator 12 is above the flicker frequency of the oscilloscope 16, the vertical and horizontal lines produced as a result of the pulses 53 and 54 will not appear to flicker. Inasmuch as the pulses 53 and 54 include, in a time sense, the maximum positive and negative amplitudes respectively of the signal 50 (see Fig. 3), the two above-referred to lines are placed on the screen of the oscilloscope 16 when the beam would normally be at or close to an extremity of its horizontal deflection. Because the reference lines are produced at the maximum positive and negative amplitudes of the signal 50, the rate of deflection that would be produced by the signal 50 is at a minimum, and consequently the percentage of the measurement waveform that is not displayed is less than the percentage of sweep time utilized for displaying the reference waveforms.

In the above-described arrangement, contacts on the relays 25 and 26 are connected to ground as a source of reference potential.

Fig. 4 shows the face 28 of the cathode ray oscilloscope 16. The device 10 of Fig. 2 may, for example, be a transistor. The lines 56 and 57 are zero reference lines in horizontal and vertical planes, respectively, and the waveforms 58 and 59 are representative of a typical alpha versus emitter current relationship in a transistor. The waveform 58 is produced as a result of a left to right sweep of the beam of the oscilloscope 16 with a sweep at the frequency of the transistor emitter current, and the waveform 59 is a result of a right to left sweep of the beam of the oscilloscope 16 with a reversal in the sweep of the emitter current of the transistor. The displacement between the waveforms 58 and 59 is representative of the hysteresis effect of the transistor.

To the right of the face 28 is shown an array of waveforms along a horizontal time axis. This array of waveforms is representative of the signals which provide the necessary vertical sweep to produce the waveforms 58 and 59 on the face 28. Immediately below the face 28 is another array of waveforms dispersed along a vertical time axis. The scales of the horizontal and vertical times axes are identical, as may be ascertained by the broken lines shown between them. The waveforms shown in the latter array produce the horizontal deflections on the face 28. To the left of the last-mentioned array is shown another waveform 50 dispersed along a vertical time axis corresponding in time to the first-mentioned vertical time axis. The waveform 50 is representative of the signal produced by the low frequency oscillator 12 and is shown herein as all other waveforms illustrated in Fig. 4 are synchronized with it.

In Fig. 4, a waveform 60, which represents the envelope signal output from the filter 15 of Fig. 2, is applied to the vertical sweep terminals 30 of the oscilloscope 16 between the times $t_1$ and $t_2$. During this same interval a low frequency signal from the oscillator 12 of Fig. 2 which is represented by a waveform 61 is applied to the horizontal sweep terminals 29 of the oscilloscope 16. This combination of inputs produces the waveform 58 on the face 28. Between the times $t_2$ and $t_3$, the pulse 53 shown in Figs. 2 and 3 causes the relay driver 22 to energize the relays 25 and 27. During this interval, the vertical terminals 30 are grounded and the horizontal terminals 29 are connected to the radio frequency oscillator 11. The effect of this is shown between the times $t_2$ and $t_3$ in Fig. 4 by a notch 62 and a radio frequency envelope 63. This action produces the horizontal line 56. At time $t_3$, the relay driver 22 de-energizes the relays 25 and 27 whereby the envelope signal output from the filter 15, as represented by a waveform 64, is applied to the vertical terminals 30 and the output from the low frequency oscillator 12 is applied to the horizontal terminals 29 to produce the waveform 59. Between the times $t_4$ and $t_7$, the alpha function reduces to zero. Between the times $t_5$ and $t_6$, the pulse 54 causes the relay driver 23 to energize the relays 24 and 26, whereby the horizontal terminals 29 are grounded and the vertical terminals 30 are connected to the output from the radio frequency oscillator 11. These effects are represented by a notch 65 and a radio frequency envelope 66, respectively. This action produces the vertical line 57 on the face 28. It will be noted that the percentage of the sweep time that is used for producing the reference lines 56 and 57 on the face 28 is relatively small and that it occurs at a time when the rate of the horizontal deflection of the beam of the cathode ray tube is at a minimum. Because of these two facts, a very small percentage of the waveforms 58 and 59 on the face 28 is lost as a result of introducing the reference lines 56 and 57.

Although relays have been shown and discussed in the illustrated embodiment of the invention, other switching means, for example, multivibrators, may be utilized. In addition, the grounded contacts of the relays 25 and 26 may be connected to any desired source of reference potentials in order to produce reference lines representative of particular potential levels. Such connections may be desirable for measuring amplitudes of test waveforms. Furthermore, it is not necessary to utilize a source of radio frequency current to produce the deflection necessary for the reference lines inasmuch as any signal having a period less than the closure time of the relays will be adequate.

The above-described arrangement of components provides a pair of zero reference lines that are at right angles with respect to one another. A single reference line arrangement may be provided in accordance with the invention by eliminating one of the relay drivers and its associated relays. Other combinations of reference lines may also be attained. It may, for example, be desirable to produce two horizontal parallel reference lines at different reference levels. This may be accomplished in accordance with the invention by rearranging some of the connections of Fig. 2. One such rearrangement is illustrated in Fig. 5. The connections made by the relays 24, 25, 26, and 27 in their unenergized position and the manner in which they are energized by the relay drivers 22 and 23 are identical to those shown in and discussed in connection with Fig. 2. When the relays 24 and 25 are energized, they respectively make contact with several reference potentials from the source 31, and, when the relays 26 and 27 are energized, they respectively make contact with the signals from the oscillator 11. The theory of operation is identical to that presented in conjunction with Figs. 2, 3, and 4 with the exception that two horizontal parallel lines are produced.

Although several embodiments of the invention have been described in detail, it is to be understood that various other embodiments of the invention may be devised without departing from the spirit and scope of the invention. Therefore, it is intended that the invention should not be considered to be limited to the illustrated embodiments.

What is claimed is:

1. In combination with an oscilloscope having a set of horizontal sweep input terminals and a set of vertical sweep input terminals, apparatus for providing a simultaneous display of reference waveforms and measurement waveforms from a first source comprising a second source of signals the frequency of which is equal to the fundamental of said measurement waveforms, a third source of signals the frequency of which is greater than said fundamental, a source of reference potentials, and means responsive to said signals from said second source for connecting said first source and said second source to respective ones of said sets of terminals during at least one predetermined portion of each cycle of said signal from said second source and for connecting said third source and said source of reference potentials to respective ones of said sets of terminals during at least one other predetermined portion of each cycle of said signal from said second source.

2. Apparatus in accordance with claim 1 wherein the period of said signals from said third source is less than each of the second mentioned portions.

3. Apparatus for use in combination with an oscilloscope having a set of horizontal sweep input terminals and a set of vertical sweep input terminals to provide a simultaneous display of reference waveforms and waveforms of measurement signals comprising a source of signals synchronous with the fundamental of said measurement signals, a source of signals having a frequency greater than said fundamental, a source of reference potentials providing at least two reference potentials, and means responsive to said synchronous signals for applying said measurement signals and said synchronous signals to respective ones of said sets of terminals during at least one predetermined portion of each cycle of said synchronous signals and for applying said reference potentials and said signals having a frequency greater than said fundamental to respective ones of said sets of terminals during at least two other predetermined portions of each cycle of said synchronous signals, only one of said reference potentials being applied to one of said sets during each of the second mentioned portions and all of said reference potentials being applied to said sets of terminals during each of said cycles.

4. Apparatus in accordance with claim 3 wherein the period of said signals having a frequency greater than said fundamental is less than each of the second mentioned portions.

5. Apparatus for supplying measurement and auxiliary signals to the sets of horizontal and vertical terminals of an oscilloscope to produce a simultaneous display of measurement and reference waveforms comprising a first source of auxiliary signals having a frequency equal to the fundamental of said measurement signals, a second source of auxiliary signals having a frequency greater than said fundamental, a source of auxiliary direct current potentials, and means responsive to said signals from said first source for applying said measurement signals and said signals from said first source to respective ones of said sets of terminals during at least one predetermined portion of each cycle of said signal from said first source and for applying said signals from said second source and said direct current potentials to respective ones of said sets of terminals during at least two other predetermined portions of each cycle of said signal from said first source, said means interchanging at least twice during each cycle the order in which said signals from said second source and said direct current potentials are applied to said sets of terminals.

6. Apparatus in accordance with claim 5 wherein the period of said signals from said second source is less than each of the second mentioned portions.

7. Apparatus in accordance with claim 6 wherein said source of direct current potentials provides at least two potentials and said means applies said potentials to said sets of terminals, only one of said potentials being applied to one of said sets of terminals during each of the second mentioned portions and all of said potentials being applied to said sets of terminals during each of said cycles.

8. In combination with an oscilloscope having a set of horizontal sweep input terminals and a set of vertical sweep input terminals, apparatus for providing a simultaneous display of measurement waveforms from a first source of signals and reference waveforms comprising a second source providing sinusoidal signals having a frequency equal to the fundamental of said measurement waveforms, a third source providing sinusoidal signals having a frequency greater than said fundamental, a source of direct current potentials, and means responsive to said sinusoidal signals from said second source for connecting said first source and said second source to respective ones of said sets of terminals during at least one predetermined portion of each cycle of said sinusoidal signals from said second source and for connecting said third source and said source of direct current potentials to respective ones of said sets of terminals during at least two other predetermined portions of each cycle of said sinusoidal signal from said second source, one of said second mentioned portions containing the maximum positive value and another of said second mentioned portions containing the maximum negative value of said sinusoidal signal from said second source.

9. Apparatus in accordance with claim 8 wherein the period of said sinusoidal signals from said third source is less than each of the second mentioned portions.

10. Apparatus in accordance with claim 9 wherein said source of direct current potentials provides at least two potentials and said means applies said potentials to said sets of terminals so that only one of said potentials is applied to one of said sets of terminals during each of the second mentioned portions and all of said potentials are applied to said sets of terminals during each of said cycles.

11. Apparatus in accordance with claim 9 wherein said connecting means interchanges at least twice during each of said cycles the order of the connections between said third source, said source of reference potentials and said respective ones of said sets of terminals.

12. Apparatus in accordance with claim 11 wherein said source of direct current potentials provides at least two potentials and said means applies said potentials to said sets of terminals, only one of said potentials being applied to one of said sets of terminals during each of the second mentioned portions and all of said potentials being applied to said sets of terminals during each of said cycles.

13. In combination with an oscilloscope having a set of horizontal input terminals and a set of vertical input terminals, apparatus for providing signals thereto whereby a simultaneous display of measurement waveforms from a first source of signals and reference waveforms is produced, comprising a second source of signals the frequency of which is equal to the fundamental of said measurement waveforms, a third source of signals the frequency of which is greater than said fundamental, a source of reference potential, at least one double-pole relay means having its arms and contacts connected to said source of reference potential, said sets of input terminals, and said first, second and third sources, so that in one of said positions, said first and second sources are simultaneously connected to respective ones of said sets of terminals and in the other of said positions, said third source and said source of reference potential are connected to respective ones of said sets of terminals, and means responsive to said signals from said second source for energizing said relay means, only one of said relay means being energized at one time and all of said relay means being energized during each cycle thereof.

References Cited in the file of this patent

UNITED STATES PATENTS

| | | |
|---|---|---|
| 2,692,974 | Garrison | Oct. 26, 1954 |
| 2,731,583 | Ellis | Jan. 17, 1956 |
| 2,745,985 | Lewis | May 15, 1956 |
| 2,778,972 | Ellis | Jan. 22, 1957 |
| 2,783,436 | Gray | Feb. 26, 1957 |